May 4, 1926.
C. R. MOORE
VIBRATION RESPONSIVE APPARATUS
Filed Oct. 3, 1921
1,583,416
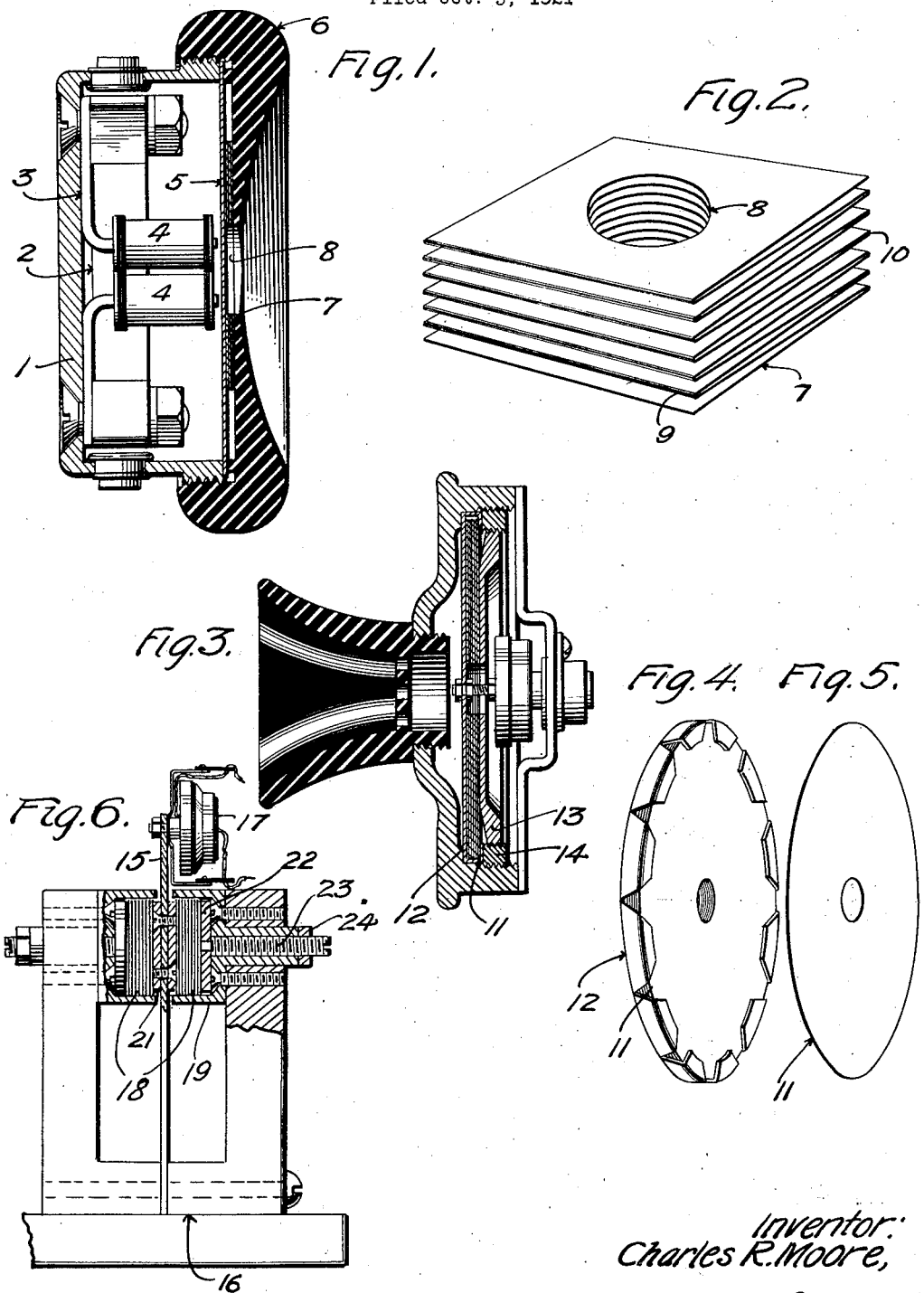
Inventor:
Charles R. Moore,
by [signature]
Att'y.

Patented May 4, 1926.

1,583,416

UNITED STATES PATENT OFFICE.

CHARLES R. MOORE, OF MAPLEWOOD, NEW JERSEY, ASSIGNOR TO WESTERN ELECTRIC COMPANY, INCORPORATED, OF NEW YORK, N. Y., A CORPORATION OF NEW YORK.

VIBRATION-RESPONSIVE APPARATUS.

Application filed October 3, 1921. Serial No. 505,059.

*To all whom it may concern:*

Be it known that I, CHARLES R. MOORE, a citizen of the United States, residing at Maplewood, in the county of Essex, State of New Jersey, have invented certain new and useful Improvements in Vibration-Responsive Apparatus, of which the following is a full, clear, concise, and exact description.

This invention relates to an improvement in sound and vibration responsive apparatus, such as used in the reproduction, recording, analyzing, and measuring of sound waves and enforced vibrations. More particularly, it relates to a means for and a method of damping the vibrating systems of such devices in such a manner as to insure a uniformly accurate and faithful reproduction of the impressed vibrational impulses over a wider range of frequencies than has heretofore been possible.

Diaphragms, such as used in telephones, phonographs and other acoustic apparatus, and reeds, such as used in interrupters, vibrators and the like, have a more or less marked natural period for one or more frequencies and when acted upon by impulses at or near these frequencies or their harmonics, will respond much more than for materially different periodicities. In the usual telephone diaphragm, for example, the lowest natural frequency may be in the neighborhood of 900 cycles per second, which is well within the range of those frequencies used in speech. Because of this natural period and the resulting inequality of response between impulses of different frequencies, the telephone diaphragm will disturb and distort speech waves which are impressed on it when the resonance point falls within the range which is of importance in speech. In such cases uniform and accurate reproduction of vibrations within the neighborhood of the natural period is precluded.

To overcome these objections in vibrating systems, various ways and means have been devised to force the vibrating member to respond equally well for all frequencies or, at least, for such frequencies as are within the range in which it is proposed to operate the device. One of these arrangements is disclosed and claimed in Wente Patent #1,333,744, of March 16, 1920, wherein the diaphragm is placed face to face and in close proximity to a rigid plate, leaving an air space of about 25 ten-thousandths of an inch thick, thus increasing the elasticity of the diaphragm until its resonance point is moved outside of the speech range so there will be practically equal response to audible frequencies of the same intensity.

This maximum response at the resonance point may also be decreased to a negligible amount by properly increasing the damping factor of the vibrating system. The damping factor in general depends upon the frictional forces and upon the effective mass of the vibratory system being directly proportional to the frictional force and inversely proportional to the mass. The damping factor may, therefore, be increased either by increasing the frictional forces or by reducing the effective mass. This will insure practically equal response at all frequencies within the audible range or within such a range as may be desired.

An object of this invention is to provide in an acoustic device an efficient and inexpensive means of damping the vibrating system and one which is applicable to practically all forms of vibrating systems.

Other objects will hereinafter appear.

In general the invention provides a plurality of air or fluid cushions supported in series arrangement between relatively movable members for controlling the relative movement of said members.

Referring to the drawings:

Fig. 1 represents an application of this invention to a telephone receiver.

Fig. 2 shows one form of the damping device as applied to the receiver.

Fig. 3 shows another application to a transmitter.

Fig. 4 illustrates another form in which the damping device is assembled with the diaphragm as a unit.

Fig. 5 shows one of the elements of the damping device of Fig. 4.

Fig. 6 illustrates an application of the invention to a vibrating reed.

In Fig. 1 which represents an application of the invention to a watch case type receiver of ordinary construction, 1 represents the case to which is secured a permanent magnet 2 and a pole piece 3 which in turn support the coils 4. On the edge of the case 1 is the usual diaphragm 5 secured thereto by means of caps 6. Loosely supported between the diaphragm and the cap and within the chamber in the cap, are a plurality of leaves 7, such as sheet aluminum, paper, or other material, in the neighborhood of .001 inch thick. The leaves in this case are provided with a circular opening 8 to permit the air vibrations to act upon the diaprhagm and may, if desired, be joined at the alternate edges shown at 9 and 10 in Fig. 2, in which case it is preferable to make the leaves square, the length of the diagonal being practically the same as that of the diameter of the chamber in the cap. The space between the diaphragm and the cap is somewhat more than the total thickness of the leaves in a compressed state, the exact difference being dependent upon the degree of damping desired. The leaves loosely filling the space between the diaphragm and the cap will separate slightly and provide space between adjacent elements for air or any suitable fluid. Essentially they will form a plurality of cushions, air cushions in this case, operating successively in series under the action of the vibrating member. It will be seen, therefore, that any motion of the diaphragm is imparted to the first cushion and successively to each cushion, subjecting the air between adjacent leaves to alternate compression and expansion, which forces it outward and draws it inward. Owing to the small space between the leaves, considerable frictional resistance is offered to this movement. The degree of damping depends on this resistance, which in turn is regulated by the number and thickness of the leaves in the space provided. In any structure, the number of cushions brought into action at any instant will depend upon the amplitude and the frequency of the vibrations. For example, vibrations of high amplitudes and low frequencies will cause a large number of the cushions to act, but the dampinig will be small as the air will flow in and out between the leaves quite freely. For higher frequencies, the damping will increase and a large number of the cushions will be brought into play, as the air will not have sufficient time to escape. One of the advantages of this damping arrangement is that it is applicable to virbrating systems in which the amplitude of the vibrating member is at times quite large. Another advantage is that while it is very effective in damping vibrations of large amplitudes, the sensitivity of the device at small amplitudes is not impaired.

In Fig. 3 the leaves are formed in the shape of washers as shown in Fig. 5 and for convenience in handling, they are loosely secured to diaphragm 12 by crimping over its edge as in Fig. 4. The sheets, leaves, or washers may, if desired, be given a dish shape although it has been found that for all practical purposes the warping or crimping which they receive in ordinary handling is sufficient to provide a practically uniform separation between the leaves. Plate 13, which is adjustably supported on clamping ring 14 may be adjusted against the leaves to produce the desired degree of damping. It is to be understood also that this arrangement is adaptable to the receiver in Fig. 1.

In Fig. 6 a reed 15, one end of which is secured to the base 16, carries at the other end a microphone element 17 for reproducing the vibrations in an electrical circuit. Any impulse imparted to the reed will set it in motion and it will vibrate at its natural frequency if left free, until the energy received from that impulse is dissipated. In a rapid succession of impulses the undamped vibrations would distort the subsequent impulses. In order, therefore, to accurately reproduce a series of impulses, the energy of the force imparted to the vibrating system by one impulse must be dissipated before the next one takes place in order that the reproduction will not be distorted. In the case illustrated, damping is applied to the reed 15 at opposite points, which are selected to give the most effective damping. Paper or aluminum foil discs are supported in the cup 18 which is slightly larger in diameter than the discs. Mounted on the reed and operating against the discs are aluminum plates 21 which partly close the open end of the cups and prevent the escape of the discs. At the closed end of the cups are adjustable plates 22 controlled by threaded screws 23 attached thereto, and adjusting nuts 24. By the use of these adjusting means the damping may be properly adjusted on each side of the reed. In order to clearly illustrate the invention recourse has been had to the apparatus illustrated. It is understood, however, that the invention is capable of wide application.

What is claimed is:

1. In an acoustic device, two members having relative movement, and means between said members comprising a plurality of leaves of the same material for damping the relative movement of said members, all of said leaves being free to move at their outer edges.

2. In an acoustic device, a vibratory member, damping means comprising a plurality of identical leaves free to move at their outer edges, and means for loosely supporting said damping means against the vibratory member.

3. In an acoustic device a vibrating member having a plane surface, a plurality of loosely mounted thin leaves separated by air films and parallel to each other and to said vibrating member, and means for supporting said leaves loosely at their edges with respect to each other and loosely with respect to the vibrating member to which they are directly applied.

4. In an acoustic device a vibrating member, a rigid member in spaced relation thereto, a plurality of identical leaves loosely supported between and against said members, and a fluid filling the interstices between said leaves.

5. A device for the transmission of sound comprising a microphone element, a vibrating member for actuating said element, and damping means composed of a plurality of substantially parallel leaves free to move at their outer edges having a fluid film between adjacent leaves, and a rigid member for supporting said damping means operatively against said vibrating member.

6. In an acoustic device, a vibrating member, a parallel second member in spaced relation thereto, a purality of identical leaves parallel to said members and partially filling the space therebetween, and means to loosely support said leaves on their edges between said members.

7. In an acoustic device, a vibrating member, a parallel second member in spaced relation thereto, a plurality of identical leaves parallel to said members and partially filling the space therebetween, means to loosely support said leaves on their edges between said members, and air films between said leaves and coextensive therewith.

8. A device for the transmission of sound comprising a microphone element, a vibrating member for actuating said element, a relatively rigid member parallel to said vibrating member and in spaced relation thereto, means for damping the vibrations of said vibrating member, said means comprising a plurality of identical leaves, means for loosely supporting said leaves between said members, said leaves resting on their edges on said supporting means, and air films between said leaves and coextensive therewith.

9. A device for the transmission of sound, comprising a vibratory member, a plurality of cushioning devices consisting of a pile of thin sheets of material separated by air films and substantially free at their edges and mounted to operate in succession, the number operating depending upon the frequency and amplitude of the vibrations of the vibratory member, and means for supporting the cushioning devices against said member.

10. A device for the transmission of sound, comprising a vibratory member, a damping means consisting of a pile of thin sheets of material substantially free at their outer edges and having air films between them, and means for loosely supporting said damping means against said vibratory member.

11. In an acoustic device, a vibrating member, a plurality of thin leaves separated by thin layers of air parallel to each other and to said vibrating member, and means for loosely supporting said leaves in a pile imposed upon said vibrating member consisting of a member parallel to said vibrating member for limiting the movement of the pile at the end away from the vibrating member and a member holding said leaves in a loose pile in axial alignment.

12. The combination with a vibratory member, of damping means comprising a pile of thin leaves providing a multiplicity of air films therebetween, and a substantially rigid support spaced from said vibratory member, said pile of leaves having one face in loose contact with said vibratory member and its opposite face against said support, whereby said air films in being compressed and relieved by the vibrations of said member act in series relation with respect to one another.

In witness whereof, I hereunto subscribe my name this 29th day of September A. D., 1921.

CHARLES R. MOORE.